US010440932B2

(12) United States Patent
Dmoch

(10) Patent No.: US 10,440,932 B2
(45) Date of Patent: Oct. 15, 2019

(54) APPARATUS FOR MAINTAINING A PET WASTE RECEPTACLE

(71) Applicant: Lynda M Dmoch, Easton, PA (US)

(72) Inventor: Lynda M Dmoch, Easton, PA (US)

( * ) Notice: Subject to any disclaimer, the term of this patent is extended or adjusted under 35 U.S.C. 154(b) by 258 days.

(21) Appl. No.: 15/455,985

(22) Filed: Mar. 10, 2017

(65) Prior Publication Data

US 2017/0258033 A1 Sep. 14, 2017

Related U.S. Application Data

(60) Provisional application No. 62/301,471, filed on Mar. 11, 2016.

(51) Int. Cl.
*A01K 1/01* (2006.01)
*A01K 1/015* (2006.01)

(52) U.S. Cl.
CPC .......... *A01K 1/0107* (2013.01); *A01K 1/0152* (2013.01)

(58) Field of Classification Search
CPC ...... A01K 1/01; A01K 1/0107; A01K 1/0152; A01K 1/015; A47G 1/175

USPC ................. 119/161, 163, 195, 168
See application file for complete search history.

(56) References Cited

U.S. PATENT DOCUMENTS

| | | | | |
|---|---|---|---|---|
| 4,696,257 A * | 9/1987 | Neary | ................. | A01K 1/0114 119/166 |
| 5,575,239 A * | 11/1996 | Bradburn | ............... | A01K 1/033 119/484 |
| D388,912 S * | 1/1998 | Hurst | ........................ | D30/161 |
| 6,086,973 A * | 7/2000 | Hazes | ............... | A44B 18/0073 24/306 |
| 6,644,245 B2 * | 11/2003 | Haze | ...................... | A01K 1/033 119/174 |
| 7,673,585 B1 * | 3/2010 | Emmi | .................. | A01K 1/0107 119/165 |
| D701,353 S * | 3/2014 | Ballentyne | ................... | D30/108 |
| 2006/0005777 A1 * | 1/2006 | Galindo | ............... | A01K 1/0107 119/165 |
| 2009/0084326 A1 * | 4/2009 | Watzke | ............... | A01K 1/0005 119/843 |

* cited by examiner

*Primary Examiner* — Kathleen I Alker
(74) *Attorney, Agent, or Firm* — Blank Rome LLP

(57) ABSTRACT

Described herein is an apparatus including a flexible sheet of material including a plurality of strips; and an adhesive system that releasably couples the flexible sheet of material to a surface of a pet waste receptacle.

15 Claims, 4 Drawing Sheets

APPARATUS FOR MAINTAINING A PET WASTE RECEPTACLE

CROSS-REFERENCE TO RELATED APPLICATION

This application claims the benefit of U.S. Provisional Application No. 62/301,471, filed Mar. 11, 2016, entitled: "Kitty Litter Louvers", the contents of which are hereby incorporated herein by reference their entirety.

FIELD OF THE DISCLOSURE

Embodiments of the present invention are directed to apparatus designed to—inter alia: alert pet owners that a pet waste receptacle has been used; remove excrement or other materials (e.g. litter) from the body of a pet; and reduce or eliminate the odor associated with pet waste receptacles.

BACKGROUND

Domesticated animals, including felines, ferrets, chinchillas, small canines and other small pets often use an indoor pet waste receptacle, e.g. a litter box, as a bathroom. Unfortunately, once these conventional pet waste receptacles become soiled, there is little pet owners can do to mitigate the odor associated therewith or prevent waste or other undesirable receptacle contents from spilling out. These issues are compounded by the fact that conventional pet waste receptacles are generally not designed to inform pet owners that a pet waste receptacle has been soiled.

Also, conventional pet waste receptacles often include a door made of hard plastic which is opaque and limits or prevents light from entering the housing cavity. In addition, the movement of these hard plastic doors is difficult to control and can lead to injury. As such, a training period is often required to acclimate a pet to using these doors. And, some pets will not use the door as they do not expend the effort required to move it from a closed position to an open position or vice versa. Sometimes this is all that is needed for a finicky pet to refuse to enter/use the pet waste receptacle. Moreover, it is not uncommon for these hard plastic doors to break after a period of time.

As such, there remains a need for apparatus that alert pet owners when a pet waste receptacle has been soiled, while also reducing or eliminating the odor caused by pet excrement and preventing spillage of receptacle contents. The apparatus should also stand the test of time and encourage rather than discourage usage by pets. Embodiments of the present invention are designed to meet these and other needs.

SUMMARY

Some embodiments of the present invention provide an apparatus for indicating usage of a pet waste receptacle comprising: a flexible sheet of material comprising a plurality of strips; and an adhesive system configured to releasably couple said flexible sheet of material to a surface of a pet waste receptacle. Other embodiments of the present invention provide a pet waste receptacle comprising: a housing comprising a cavity, the cavity sized to accommodate at least one animal, the housing having an aperture permitting ingress and egress therefrom; and an apparatus comprising a flexible sheet of material comprising a plurality of strips and an adhesive system, wherein said partition is releasably coupled to said housing.

Further embodiments provide an apparatus or a pet waste receptacle which is designed to remove excrement or debris from the body of an animal. Yet other embodiments provide an apparatus and a pet waste receptacle designed to substantially restrict airflow between the interior of the housing and the exterior of the housing of a pet waste receptacle.

DETAILED DESCRIPTION

Figure 1:
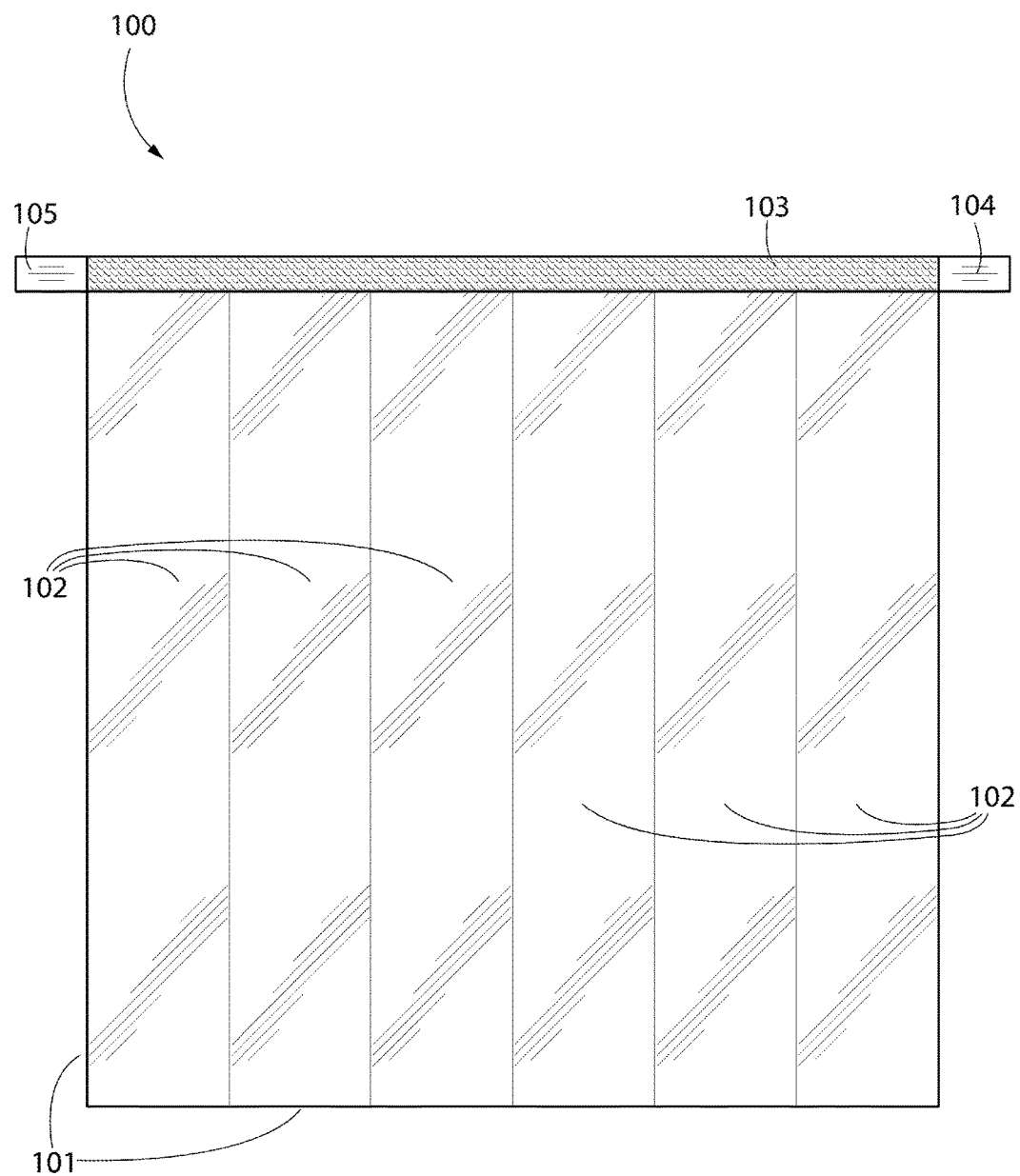
FIG. 1 depicts an apparatus according to some embodiments of the present invention.

In some embodiments, the present invention provides an apparatus for use in a pet waste receptacle, e.g., a litter box. In some embodiments, the apparatus acts as an indicator to visually inform the pet owner when the pet waste receptacle has been used and needs cleaning. Other embodiments provide an apparatus designed to keep the odor contained and keep litter from spilling outside of a litter box. In other embodiments, the apparatus of the present invention allow an animal to enter or exit a pet waste receptacle without hesitation and without fear of getting stuck in, for example, a swinging door. Certain embodiments of the present invention do not include a hinged door. Rather, in some embodiments, the apparatus is attached to the pet waste receptacle by way of an adhesive component. In some embodiments, the adhesive system comprises a hook and loop fastener (such as a VELCRO® Brand fastener). In some embodiments, the adhesive system comprises two-sided hook and loop fastener (such as a VELCRO® Brand fastener) strips.

In some embodiments, the apparatus is affixed to a surface of the housing of a pet waste receptacle such that the apparatus covers the aperture through which the pet enters and exits the receptacle. In some embodiments, the apparatus is affixed to an inner surface of the housing. In further embodiments, substantially all of the apparatus is present on the interior of the housing of the pet waste receptacle. In other embodiments, when a pet uses the pet waste receptacle and exits, the apparatus also exits the pet waste receptacle and ends up on the outside of the housing, signaling the pet owner that the receptacle has been used and needs cleaning.

In further embodiments the apparatus is sufficiently transparent to permit light into the pet waste receptacle.

Still further embodiments provide an apparatus comprising a flexible sheet of material comprising a plurality of strips; and an adhesive system. In some embodiments, the adhesive system comprises a hook and loop fastener (such as a VELCRO® Brand fastener). In other embodiments, the adhesive system comprises two double sided strips of half inch hook and loop fastener (such as a VELCRO® Brand fastener). In further embodiments, the adhesive system comprises two double sided strips of half inch hook and loop fastener (such as a VELCRO® Brand fastener).

In some embodiments, the flexible sheet of material is substantially square. In other embodiments, the flexible sheet of material is about twelve inches in length and has a width of about twelve inches. In some embodiments, the flexible sheet of material comprises vinyl. In some embodiments, the flexible sheet of material has a thickness of from about four (4) millimeters to about seven (7) millimeters.

In some embodiments, the flexible sheet of material comprises a plurality of strip, wherein each strip has a width of from about one (1) inch to about three (3) inches. In some embodiments each strip has a width of about two (2) inches. The vinyl sheet is cut to have 6 two-inch strips.

In some embodiments, the flexible sheet of material is affixed to the hook strip of the hook and loop fastener (such as a VELCRO® Brand fastener). In some embodiments, the hook strip of the hook and loop fastener (such as a VELCRO® Brand fastener) is coupled to the loop strip of the hook and loop fastener (such as a VELCRO® Brand fastener). In some embodiments, the adhesive system further comprises tabs affixed to the hook strip of the hook and loop fastener (such as a VELCRO® Brand fastener). In other embodiments, the adhesive system further comprises one (1) inch tabs on either end of the hook strip of the hook and loop fastener (such as a VELCRO® Brand fastener). In some embodiments, the tabs make it easier to remove the flexible sheet of material for cleaning or repositioning.

In some embodiments, the apparatus is affixed to an interior surface of the pet waste receptacle, such that the flexible sheet of material comprising a plurality of strips remains inside the pet waste receptacle. In some embodiments, the flexible sheet of material is positioned within the housing cavity after the pet waste receptacle is cleaned. In some embodiments, this position is considered the clean position. In some embodiments, the flexible sheet of material is displaced by an animal exiting the pet waste receptacle. In some embodiments, the flexible sheet of material is displaced by an animal exiting the pet waste receptacle and is positioned outside the housing cavity of the pet waste receptacle. In some embodiments, the displacement of the flexible sheet of material to the exterior of the housing cavity of the pet waste receptacle is referred to as dirty position. In some embodiments, the dirty position may also be referred to as the "used position", the "soiled position" and the like.

In some embodiments, the apparatus is affixed to an interior surface of the housing of the pet waste receptacle, such that the adhesive system is not visible from the exterior of the pet waste receptacle.

As discussed elsewhere herein, in some embodiments, the flexible sheet comprises a plurality of strips, wherein at least one strip of the plurality of strips is substantially transparent. In some embodiments, more than one strip of the plurality of strips is substantially transparent. In some embodiments, the apparatus of the present invention obviates the need for a door on the pet waste receptacle. In some embodiments, the absence of a door allows a domesticated animal to enter the pet waste receptacle without fear of injury.

In other embodiments, the apparatus of the present invention permits the transmission of light into the housing cavity. In certain embodiments, the transparency of the strips encourages the animal to enter to the pet waste receptacle. In some embodiments, the strips are sufficiently transparent to facilitate an animal's entry into the pet waste receptacle.

In some embodiments, the present invention provides an apparatus for indicating usage of a pet waste receptacle comprising: a flexible sheet of material comprising a plurality of strips; and an adhesive system configured to releasably couple said flexible sheet of material to a surface of a pet waste receptacle.

In some embodiments, each strip of said plurality of strips comprises a top edge, a bottom edge and two side edges, each side edge extending from the top edge of said strip to the bottom edge of said strip. In some embodiments, each strip of said plurality of strips comprises a bottom portion, a middle portion and a top portion. In other embodiments, the bottom portion of at least one strip is releasably coupled to the bottom portion of an adjacent strip.

In some embodiments, the adhesive system comprises a hook and loop fastener (such as a VELCRO® Brand fastener), a mushroom-type hook strip, or a pressure sensitive adhesive. In some embodiments, the adhesive system comprises a hook and loop fastener (such as a VELCRO® Brand fastener).

In other embodiments, the flexible sheet of material comprises a polymer, a non-woven material, or a combination thereof. In some embodiments, the flexible sheet of material comprises vinyl.

In some embodiments, at least one strip, of the plurality of strips, is substantially transparent. In some embodiments, more than one strip is substantially transparent.

In some embodiments, each strip has a width of from about one to about three inches. In further embodiments, each strip has a width of about two inches. In some embodiments, each strip has a thickness of from about four to about seven millimeters. In other embodiments, each strip has a thickness of about 5 millimeters.

Other embodiments of the present invention provide a pet waste receptacle comprising: a housing comprising a cavity, the cavity sized to accommodate at least one animal, the housing having an aperture permitting ingress and egress therefrom; and a partition comprising a flexible sheet of material comprising a plurality of strips and an adhesive system; wherein said partition is releasably coupled to said housing. In some embodiments, the partition is releasably coupled to an interior surface of said housing.

In some embodiments, the partition has a top edge, a bottom edge and two side edges. In some embodiments, the animal is selected from a canine, a feline, a ferret, a chinchilla. In other embodiments, the animal is selected from a canine and a feline. In further embodiments, the animal is a feline.

In some embodiments, the partition is configured to reversibly move from the interior of said housing to the exterior of said housing. In further embodiments, the partition has a flexural modulus sufficient to remove excrement or debris from the body of an animal exiting the housing. In some embodiments, the partition has a flexural modulus sufficient to remove litter from the body of a feline exiting the housing. In some embodiments, the partition may be positioned in a clean state or a dirty state. In some embodiments, the partition is moveable between a clean state and a dirty state. In some embodiments, the partition has a thickness sufficient to substantially restrict airflow between the interior of the housing and the exterior of the housing.

Figure 2:
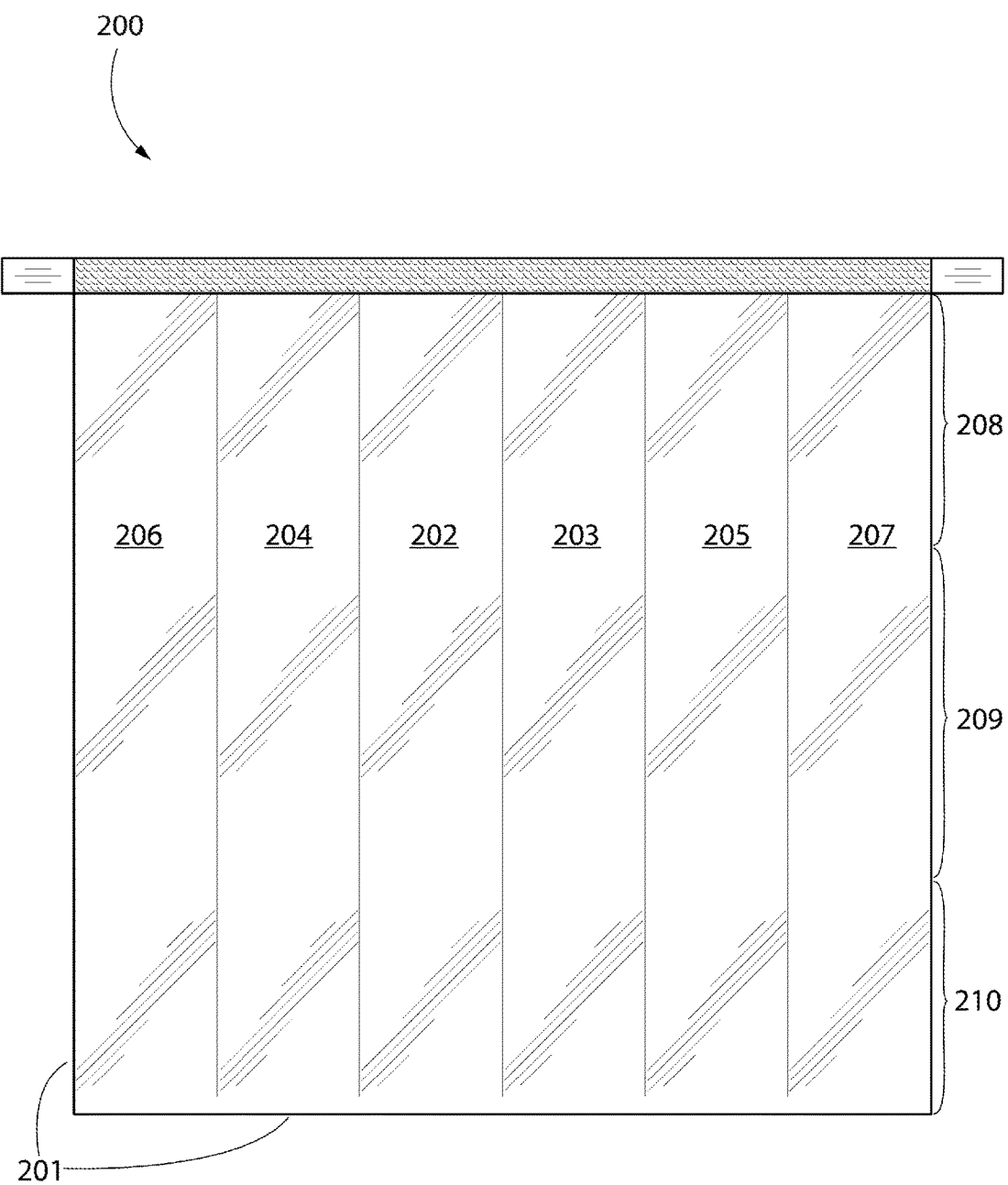
FIG. 2 depicts an apparatus according to other embodiments of the present invention.

FIG. 1 depicts an apparatus 100 according to some embodiments of the present invention. As shown therein, apparatus 100 comprises a flexible sheet of material 101 comprising a plurality of strips 102; and an adhesive component 103. In some embodiments, apparatus 100 further comprises tabs 104, 105 on either of the adhesive component 103, which facilitate the manipulation of the flexible sheet of material 101 for cleaning and/or repositioning. The embodiment depicted in FIG. 1, provides a plurality of strips 102, each having equal dimensions; however, the invention is not intended to be limited in that manner FIG. 2 depicts certain embodiments of the present invention wherein the apparatus 200 comprises a flexible sheet of material 201 comprising a plurality of strips 202, 203, 204, 205, 206, 207, wherein each strip 202 comprises a top portion 208, a middle portion 209 and a bottom portion 210.

In some embodiments, the apparatus of the present invention may comprise any number of strips having a variety of dimensions. In some embodiments, the internal strips 202, 203 have a first set of dimensions; the intermediate strips 204, 205 have a second set of dimensions; and the outer strips 206, 207 have a third set of dimensions. In some embodiments, the strip dimensions are tailored to the particular animal or the particular size of a specific animal. In some embodiments, all of the strips have the same dimensions. As illustrated in FIG. 2, the bottom portion 210 of a strip (e.g. 202) can be releasably coupled to the bottom portion 210 of an adjacent strip (e.g. 203). In some embodiments, this allows the flexible sheet of material 201 to be more rigid, thereby increasing the contact time and friction against an animal's body upon exit from a pet waste receptacle. In some embodiments, this additional contact time and/or friction increases the ability of the apparatus 200 to prevent litter or excrement from escaping a pet waste receptacle. In further embodiments, wherein the bottom portions 210 of adjacent strips are releasably coupled, adjacent strips may be separated from one another prior to the apparatus being affixed to a pet waste receptacle.

Figure 3:
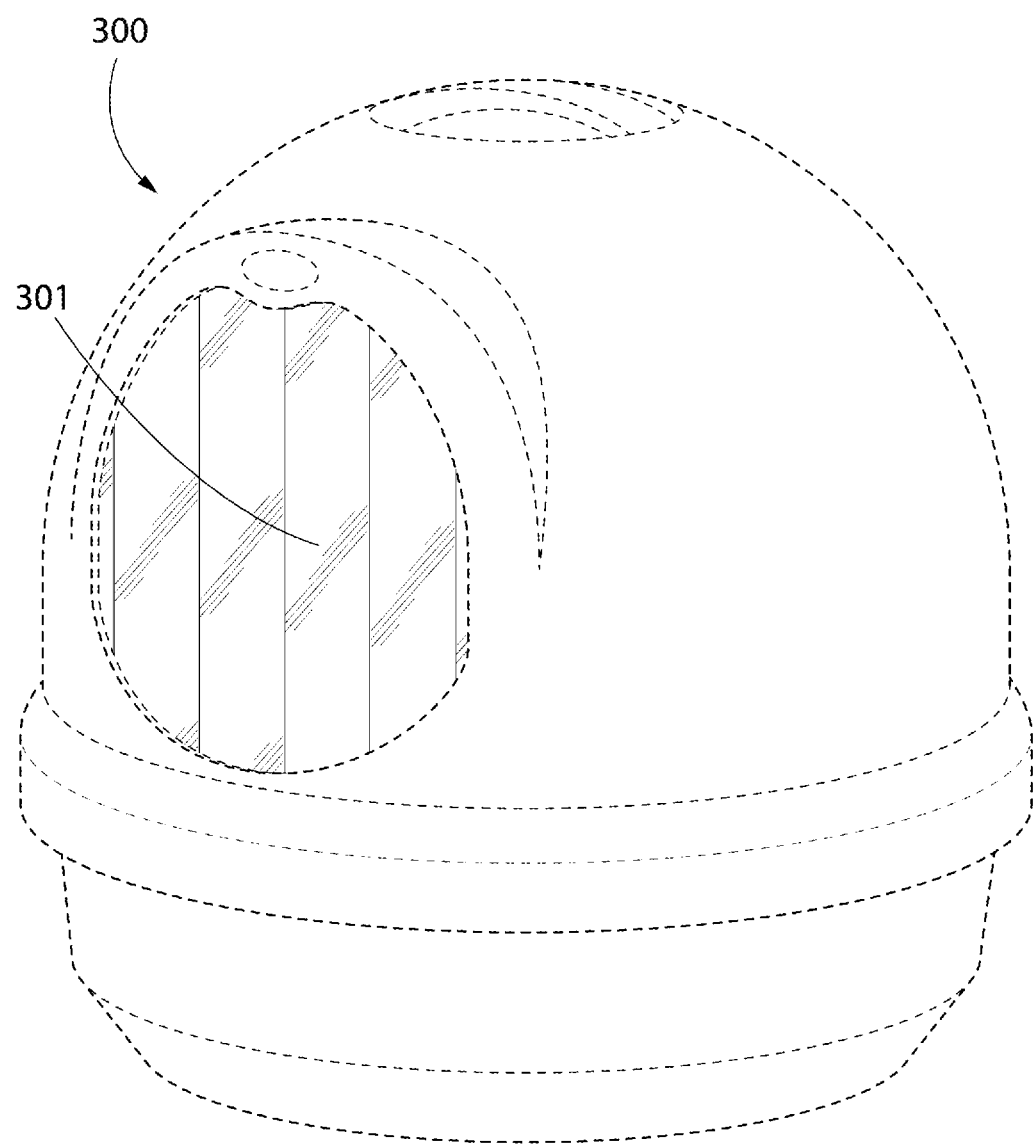
FIG. 3 depicts an apparatus according to some embodiments of the present invention, in a first position.

As shown in FIG. 3, certain embodiments of the present invention provide a partition 301 that is affixed to an inner surface of a pet waste receptacle 300, and is maintained in a pre-use position. In some embodiments, the pre-use position is referred to as the "first position".

Figure 4:
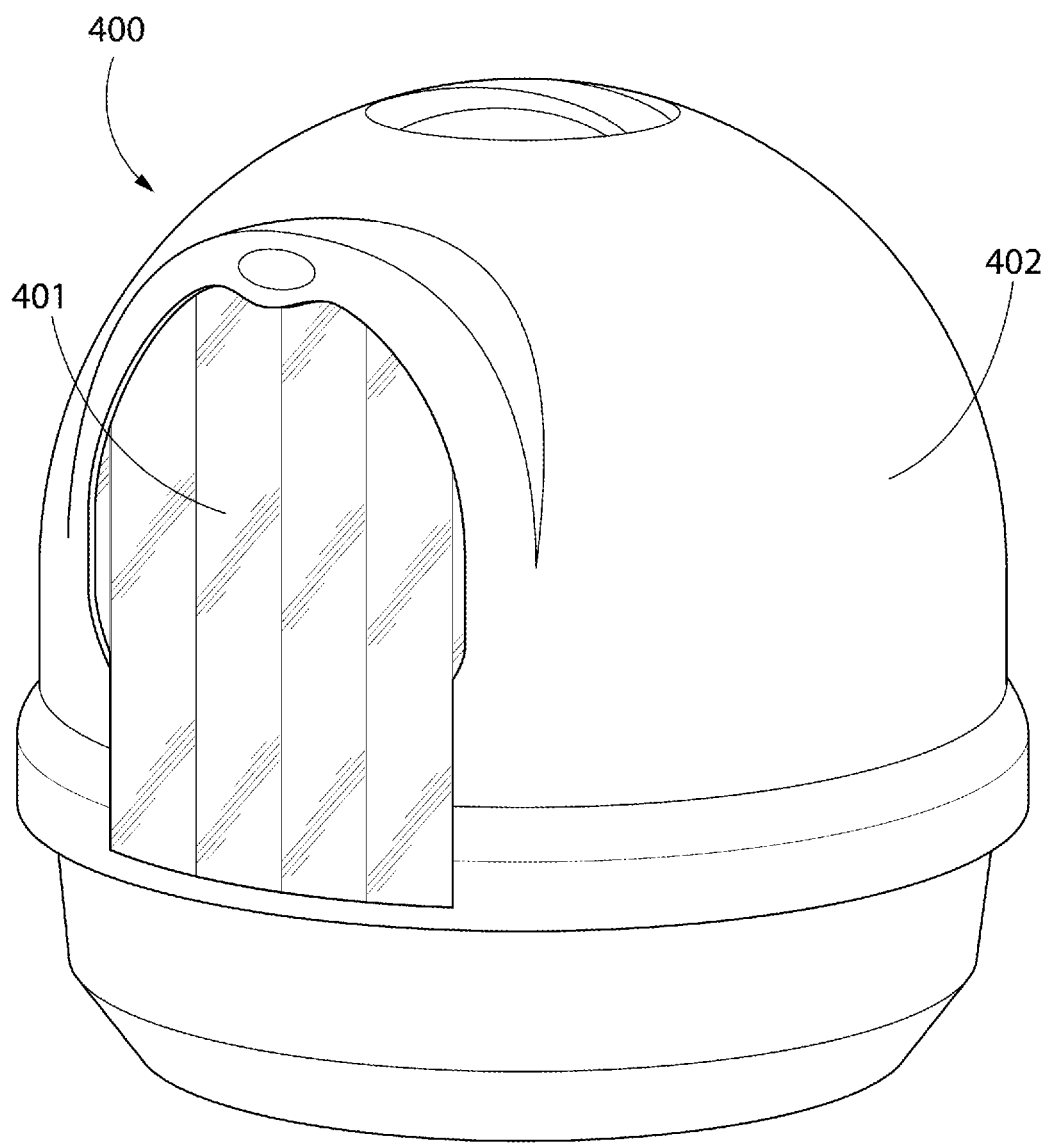
FIG. 4 depicts an apparatus according to some embodiments of the present invention, in a second position.

FIG. 4 depicts certain embodiments of the present invention wherein a partition 401 according to some embodiments of the present invention is affixed to an inner surface of a pet waste receptacle 400, and is displaced to a post-use position. In some embodiments, the post-use position is referred to as the "second position". As shown in FIG. 4, the partition is displaced in such a manner that it substantially restricts airflow between the interior of the housing (not shown) and the exterior of the housing 402 of the pet waste receptacle 400. It is important to note that the shape and configuration of the pet waste receptacle 400 depicted in FIG. 4 is not intended to be limiting in any way. For avoidance of doubt, the pet waste receptacles of the present invention can be of any shape, and made from any material, and can accommodate a domesticated animal inside or outside a dwelling.

The invention will now be described in conjunction with the following, non-limiting examples.

EXAMPLES

Example 1: Material Selection

An apparatus employing a thin plastic was evaluated for use in a pet waste receptacle according to some embodiments of the present invention. While this material is easy to cut and size, its lack of durability renders it unsuitable for use in accordance with the methods of the present invention. Specifically, the material is not able to withstand multiple uses and cleanings, without tearing/cracking/splitting. In addition to not being suitable to function in the manner it was intended, the torn material could also be hazardous to a pet. Having discovered these deficiencies a second material—vinyl—was evaluated. Experiments using vinyl in accordance with the methods of the present invention were undertaken. Observations from pet usage indicated high durability, while also being sufficiently soft and pliable to obviate safety concerns for the pet while in use. Vinyl is also demonstrates a forgiving quality by which the pet does not realize the material is in contact with its tail or other body parts, despite the tail or body part being outside of the pet waste receptacle housing. Vinyl is also easy to clean and maintains its shape even after repeated cleanings.

Example 2

Various thicknesses for the flexible sheet of material in accordance with certain embodiments of the present invention were evaluated. Based on these evaluations, a thickness of five (5) millimeters was selected. This thickness provided the optimum weight for the plurality of strips, allowing it to not be too heavy and intimidating for the pets, especially for their first use. This thickness also made the strips strong enough for multiple uses and able to hold up to multiple washings. In addition, this gauge proved heavy enough to fall back into place without problem. Flexible sheets thinner than about four millimeters were found to be too light in weight when the pet passed through, as demonstrated by the strips adhering to the pet. Moreover, these thinner strips were not able to adequately prevent litter spillage or odor. Similarly, strips having thicknesses greater than seven millimeters (7 mm) were found to be too heavy and unacceptably opaque; making them difficult to move and resulting in little to no light being allowed to enter the housing.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. An apparatus for indicating usage of a pet waste receptacle comprising:
   a flexible sheet of material comprising a plurality of strips; and
   an adhesive system configured to releasably couple said flexible sheet of material to a surface of the pet waste receptacle, wherein the adhesive system comprises at least one tab configured for removing the flexible sheet of material from the surface for cleaning or repositioning;
   wherein the strips are configured to each have a length greater than a height of an aperture of the pet waste receptacle such that the strips extend below a bottom edge of the aperture, wherein each strip has a width of from about one to about three inches and has a thickness of from about four to about seven millimeters, and wherein at least one strip, of the plurality of strips, is substantially transparent; and
   wherein the flexible sheet of material is configured to reversibly move from an interior of said pet waste receptacle to an exterior of said pet waste receptacle, via the aperture, whereby such movement is indicative that a pet has exited the pet waste receptacle via the aperture.

2. The apparatus according to claim 1, wherein each strip of said plurality of strips comprises a top edge, a bottom edge and two side edges, each side edge extending from the top edge to the bottom edge.

3. The apparatus according to claim 2, wherein each strip of said plurality of strips comprises a bottom portion, a middle portion and a top portion.

4. The apparatus according to claim 3, wherein the bottom portion of at least one strip is releasably coupled to the bottom portion of an adjacent strip.

5. The apparatus according to claim 1, wherein the adhesive system comprises a hook and loop fastener, a mushroom-type hook strip, or a pressure sensitive adhesive.

6. The apparatus according to claim 5, wherein the flexible sheet of material comprises vinyl.

7. The apparatus according to claim 1, wherein said flexible sheet of material comprises a polymer, a non-woven material, or a combination thereof.

8. The apparatus according to claim 1, wherein the adhesive system comprises a hook and loop fastener.

9. A pet waste receptacle comprising:
a housing comprising a cavity, the cavity sized to accommodate at least one animal, the housing having an aperture permitting ingress and egress therefrom;
a partition comprising a flexible sheet of material comprising a plurality of strips, wherein the strips each have a length greater than a height of the aperture such that the strips extend below a bottom edge of the aperture, wherein each strip has a width of from about one to about three inches and has a thickness of from about four to about seven millimeters, and wherein at least one strip, of the plurality of strips, is substantially transparent; and
an adhesive system;
wherein said partition is releasably coupled to said housing via the adhesive system, and wherein the adhesive system comprises at least one tab configured for removing the partition from the housing for cleaning or repositioning; and
wherein the flexible sheet of material is configured to reversibly move from an interior of said housing to an exterior of said housing, via the aperture, whereby such movement is indicative that the at least one animal has exited the housing via the aperture.

10. The pet waste receptacle according to claim 9, wherein said partition is releasably coupled to an interior surface of said housing via the adhesive system.

11. The pet waste receptacle according to claim 9, wherein said partition has a top edge, a bottom edge and two side edges.

12. The pet waste receptacle according to claim 9, wherein each strip in the plurality of strips comprises a top edge, a bottom edge and two side edges, each side edge extending from the top edge to the bottom edge of each strip.

13. The pet waste receptacle according to claim 9, wherein the cavity is sized to accommodate the at least one animal selected from a canine and a feline.

14. The pet waste receptacle according to claim 9, wherein the partition has a flexural modulus sufficient to remove excrement or debris from the body of an animal exiting the housing.

15. The pet waste receptacle according to claim 9, wherein the partition has a thickness sufficient to substantially restrict airflow between an interior of the housing and an exterior of the housing.

* * * * *